US012694208B2

(12) United States Patent \
Antognini et al.

(10) Patent No.: US 12,694,208 B2 \
(45) Date of Patent: Jul. 28, 2026

(54) DOMAIN-SPECIFICITY PREDICTION FOR NATURAL LANGUAGE PROCESSING

(71) Applicant: International Business Machines Corporation, Armonk, NY (US)

(72) Inventors: Diego Matteo Antognini, Ruvigliana (CH); Francesco Fusco, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 18/187,875

(22) Filed: Mar. 22, 2023

(65) Prior Publication Data

US 2024/0320429 A1     Sep. 26, 2024

(51) Int. Cl.
| | |
|---|---|
| *G06F 40/205* | (2020.01) |
| *G06F 16/35* | (2019.01) |
| *G06F 40/284* | (2020.01) |
| *G06F 40/47* | (2020.01) |

(52) U.S. Cl.
CPC ............ *G06F 40/284* (2020.01); *G06F 16/35* (2019.01)

(58) Field of Classification Search
CPC .... G06F 40/295; G06F 40/205; G06F 40/279; G06F 16/3344; G06F 40/30; G06F 16/35; G06F 40/284
See application file for complete search history.

(56) References Cited

U.S. PATENT DOCUMENTS

| | | | |
|---|---|---|---|
| 8,250,092 | B2 | 8/2012 | Gollapudi |
| 8,370,319 | B1 | 2/2013 | Krynski |

| | | | | |
|---|---|---|---|---|
| 8,583,640 | B2 | 11/2013 | Zhang | |
| 10,157,223 | B2 | 12/2018 | Misra | |
| 11,030,999 | B1 * | 6/2021 | Yu ............................ | G10L 15/30 |
| 11,361,571 | B1 | 6/2022 | Fusco | |
| 2009/0177463 | A1 | 7/2009 | Gallagher et al. | |
| 2013/0086509 | A1 | 4/2013 | Satyanarayana | |

(Continued)

FOREIGN PATENT DOCUMENTS

| | | | | |
|---|---|---|---|---|
| CN | | 107679244 A | * | 2/2018 |

OTHER PUBLICATIONS

Eigenmann et al, "Evaluating Text Classification Models on Multilingual Documents", 2021, Master Thesis, Department of Informatics, University of Fribourg, pp. 1-42 (Year: 2021).*

(Continued)

*Primary Examiner* — Olujimi A Adesanya \
(74) *Attorney, Agent, or Firm* — Anthony Curro

(57) ABSTRACT

A method, computer-program product and computer system are provided to determine domain-specificity of a text term. A processor receives a plurality of domain-specific text corpora, wherein each of the plurality of domain-specific text corpora comprises a plurality of text documents of a respective domain. A processor trains a set of subword-unit tokenizers with at least two different vocabulary sizes of the respective domain-specific text corpus. A processor receives the text-term. A processor determines a domain-specificity fingerprint of the text-term, wherein the domain-specificity fingerprint comprises for each subword-unit tokenizer a number of subword-units required to represent the text-term. A processor provides the domain-specificity fingerprint for determining the domain-specificity of the text term.

14 Claims, 6 Drawing Sheets

(56) References Cited

U.S. PATENT DOCUMENTS

| | | | |
|---|---|---|---|
| 2016/0117386 A1* | 4/2016 | Ajmera | G06F 40/30 |
| | | | 707/740 |
| 2017/0060842 A1 | 3/2017 | Dwarakanath et al. | |
| 2018/0144744 A1 | 5/2018 | Badarinath et al. | |
| 2018/0260383 A1 | 9/2018 | Beller | |
| 2018/0260472 A1 | 9/2018 | Kelsey et al. | |
| 2021/0141798 A1* | 5/2021 | Steedman Henderson | |
| | | | G06N 3/045 |
| 2022/0101113 A1* | 3/2022 | Tam | G06N 3/045 |
| 2022/0179906 A1* | 6/2022 | Desai | G06F 16/93 |
| 2022/0279014 A1* | 9/2022 | Stokes, III | G06F 21/56 |
| 2022/0382972 A1* | 12/2022 | El-Kurdi | G06F 40/216 |
| 2022/0383096 A1 | 12/2022 | Zhu et al. | |
| 2023/0017396 A1 | 1/2023 | Weerasinghe et al. | |
| 2023/0055769 A1 | 2/2023 | Fusco | |
| 2024/0095268 A1* | 3/2024 | Dhar | G06F 16/3329 |
| 2024/0184818 A1* | 6/2024 | Fume | G06F 40/205 |
| 2024/0241902 A1* | 7/2024 | Shalmashi | G06F 16/35 |
| 2024/0289551 A1* | 8/2024 | Agarwal | G06F 40/284 |
| 2024/0320249 A1 | 9/2024 | Fusco et al. | |

OTHER PUBLICATIONS

Lee et al, "Optimizing Domain Specificity of Transformer-based Language Models for Extractive Summarization of Financial News Articles in Korean", 2021, InProceedings of the 35th Pacific Asia Conference on Language, Information and Computation 2021 (pp. 611-621). (Year: 2021).*

Bordea, Georgeta, "Domain adaptive extraction of topical hierarchies for Expertise Mining", NUI Galway, Sep. 11, 2013, 191 pages.

Chirkova et al., "CodeBPE: Investigating Subtokenization Options for Large Language Model Pretraining on Source Code", ICLR Workshop on Deep Learning for Code, 2022, 13 pages.

Constant et al., "Multiword Expression Processing: A Survey", Computational Linguistics, vol. 43, No. 4, © 2017 Association for Computational Linguistics, 56 pages.

Dowlagar et al., "Unsupervised Technical Domain Terms Extraction using Term Extractor", arXiv:2101.09015v1 [cs.CL] Jan. 22, 2021, 4 pages.

He, Tiantian, "Specificity Prediction for Sentences in Press Releases", Uppsala University, Jun. 17, 2020,31 pages.

Kim et al., "An Unsupervised Approach to Domain-Specific Term Extraction", printed on Dec. 20, 2022, 5 pages, <https://aclanthology.org/U09-1013.pdf>.

Korkontzelos, Ioannis, "Unsupervised Learning of Multiword Expressions", Ph.D, Thesis, The University of York, Sep. 20, 2010, 258 pages.

Qi et al., "Deep Learning for Character-based Information Extraction", printed on Dec. 20, 2022, 9 pages, <http://www.cs.cmu.edu/~qyj/zhSenna/2014_ecir2014_full.pdf>.

Riedl et al., "A Single Word is not Enough: Ranking Multiword Expressions Using Distributional Semantics", Proceedings of the 2015 Conference on Empirical Methods in Natural Language Processing, Lisbon, Portugal, Sep. 17-21, 2015, © 2015 Association for Computational Linguistics, 11 pages.

Ryu et al., "Determining the Specificity of Terms based on Information Theoretic Measures", CompuTerm 2004 Poster Session—3rd International Workshop on Computational Terminology, 5 pages.

Sachidananda et al., "Efficient Domain Adaptation of Language Models via Adaptive Tokenization", Proceedings of the 2nd Workshop on Simple and Efficient Natural Language Processing, Nov. 10, 2021, © 201 Association for Computational Linguistics, 11 pages.

Zhang et al., "Improving Domain-specific Entity Recognition with Automatic Term Recognition and Feature Extraction", 2010, 8 pages., <http:/lrec.elra.info/proceedings/lrec2010/pdf/214_Paper.pdf>.

Fusco et al., Determining Specificity of Text Terms in Application Contexts, U.S. Appl. No. 18/187,862, filed Mar. 22, 2023, 41 pages.

IBM Appendix P, list of patents and patent applications treated as related, Filed Herewith, 2 pages.

"SimGet is a service to train and query word embeddings (word2vec and Glove)", zrl-cogsys/simget, Jan. 15, 2025, 6 pages.

Baeza-Yates, "Semantic query understanding," in Proceedings of the 40th International ACM SIGIR Conference on Research and Development in Information Retrieval, ser. SIGIR '17. New York, NY, USA: Association for Computing Machinery, Aug. 2017, p. 1357.

Beltagy et al., "Scibert: Pretrained contextualized embeddings for scientific text," arXiv:1903.10676, Sep. 2019, 6 pages.

Bostrom et al., "Byte pair encoding is suboptimal for language model pretraining," in Findings of the Association for Computational Linguistics: EMNLP 2020. Online: Association for Computational Linguistics, Nov. 2020, pp. 4617-4624.

Fix et al., "Discriminatory analysis. nonparametric discrimination: Consistency properties," International Statistical Review, vol. 57, No. 3, Dec. 1989, 138 pages.

Kudo, "Subword regularization: Improving neural network translation models with multiple subword candidates," in Proceedings of the 56th Annual Meeting of the Association for Computational Linguistics (vol. 1: Long Papers). Melbourne, Australia: Association for Computational Linguistics, Jul. 2018, pp. 66-75.

Lo et al., "S2ORC: The Semantic Scholar Open Research Corpus", Proceedings of the 58th Annual Meeting of the Association for Computational Linguistics, Jul. 5-10, 2020, pp. 4969-4983.

Schuster et al., "Japanese and korean voice search," in International Conference on Acoustics, Speech and Signal Processing, 2012, pp. 5149-5152.

Sennrich et al., "Neural Machine Translation of Rare Words with Subword Units", Proceedings of the 54th Annual Meeting of the Association for Computational Linguistics, Aug. 2016, pp. 1715-1725.

Staar et al., "IBM Research's open-source toolkit for Deep Search", Retrieved from: https://research.ibm.com/blog/deep-search-toolkit, Jul. 2022, 6 pages.

Unknown, "Deep Search", Retrieved from: https://ds4sd.github.io/, 2023, 11 pages.

Unknown, "Expanding Concept Understanding in Microsoft Academic Graph", Retrieved from: https://www.microsoft.com/en-us/research/articles/expanding-concept-understanding-in-microsoft-academic-graph/, Feb. 26, 2020, 6 pages.

Unknown, "Inside—outside—beginning (tagging)", Retrieved from: https://en.wikipedia.org/wiki/Inside%E2%80%93outside%E2%80%93beginning_(tagging), Sep. 2013, 3 pages.

Zheng et al., "A survey of query result diversification," Knowl. Inf. Syst., vol. 51, No. 1, Apr. 2017, 46 pages.

Tran, Hanh Thi Hong, et al. "The recent advances in automatic term extraction: A survey." arXiv preprint arXiv:2301.06767, 2023, 25 pages.

* cited by examiner

100

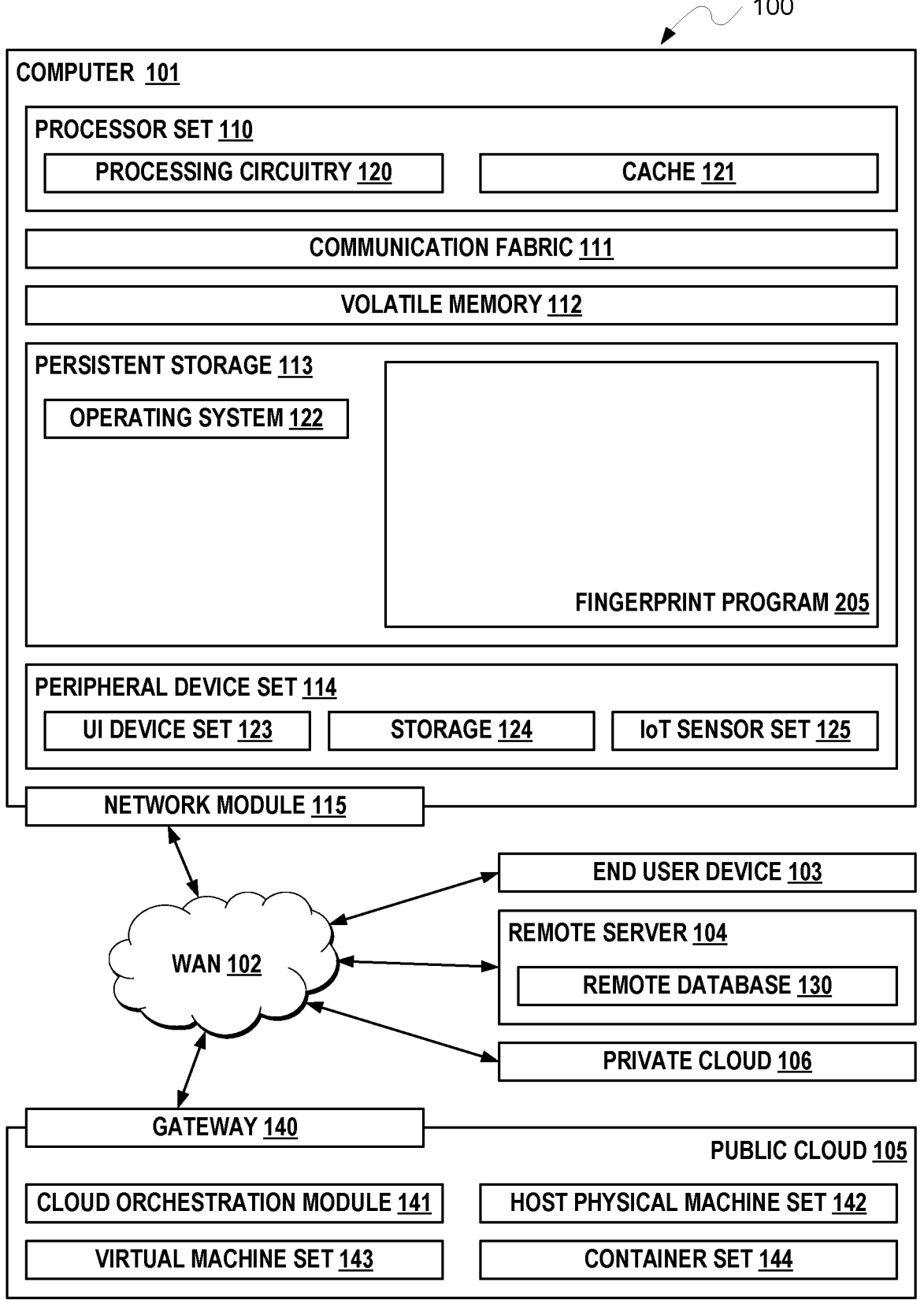

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

FINGERPRINT PROGRAM 205

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

DISTRIBUTION OF SUBWORDS

DOMAIN-SPECIFICITY PREDICTION FOR NATURAL LANGUAGE PROCESSING

BACKGROUND OF THE INVENTION

The present invention relates generally to the field of natural language processing, and more particularly to determine relevant knowledge domains of input text.

The domain-specificity of a text term, i.e., a word or a multiword expression, is a measure to predict whether a word or multiword expression is uniformly used across multiple domains or whether it is peculiar of a specific domain (domain specific). Ranking multiword expressions by domain specificity has many important applications ranging from search, summarization, and term extraction.

SUMMARY

Embodiments of the present invention provide a method, system, and program product to determine domain-specificity of a text term. A processor receives a plurality of domain-specific text corpora, wherein each of the plurality of domain-specific text corpora comprises a plurality of text documents of a respective domain. A processor trains a set of subword-unit tokenizers with at least two different vocabulary sizes of the respective domain-specific text corpus. A processor receives the text-term. A processor determines a domain-specificity fingerprint of the text-term, wherein the domain-specificity fingerprint comprises for each subword-unit tokenizer a number of subword-units required to represent the text-term. A processor provides the domain-specificity fingerprint for determining the domain-specificity of the text term.

BRIEF DESCRIPTION OF THE SEVERAL VIEWS OF THE DRAWINGS

FIG. 1 depicts a block diagram of components of the computing device executing a fingerprint program, in accordance with an exemplary embodiment of the present invention.

DETAILED DESCRIPTION

Figure 2A:
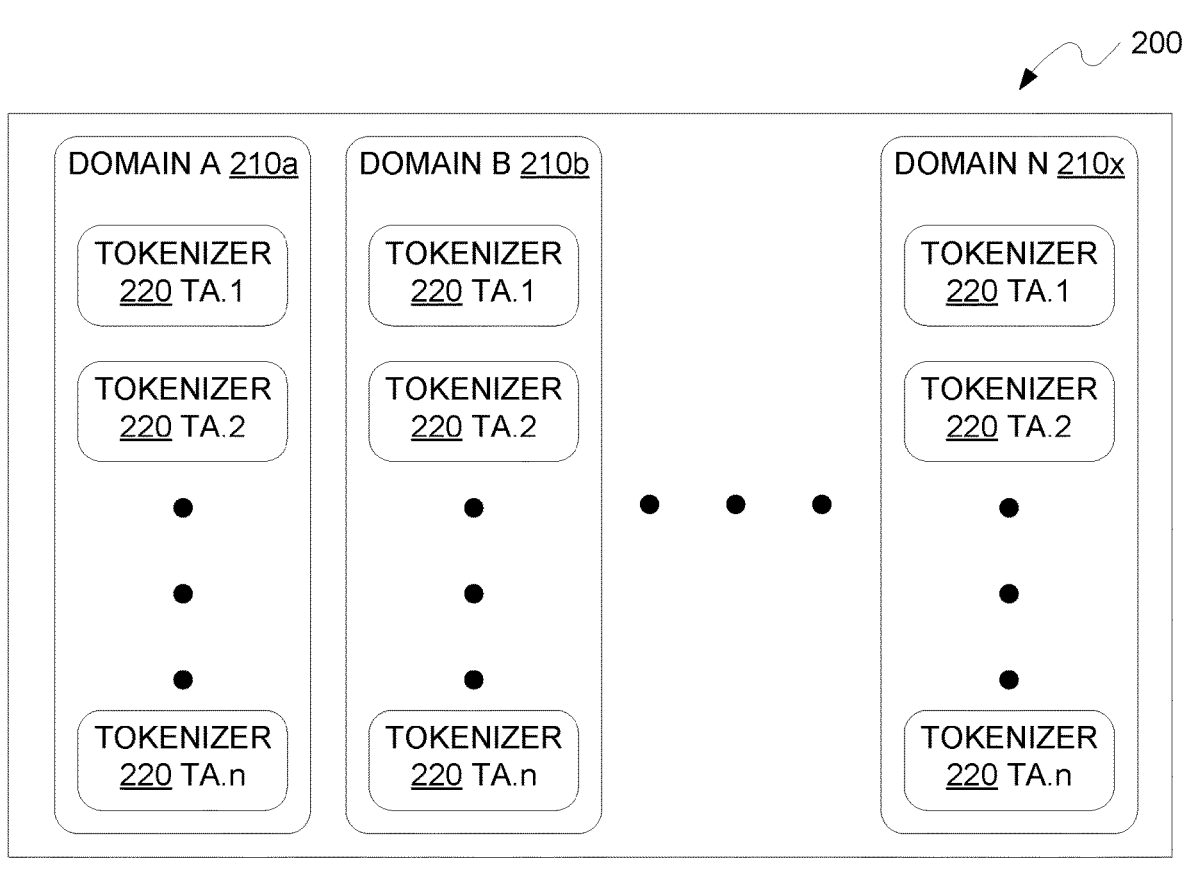
FIG. 2A depicts a cognitive model which may be used in a computer-implemented method for determining domain-specificity of a text term according to an embodiment of the invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as fingerprint program 205, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods (i.e., fingerprint program 205) may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In reference to FIGS. 1-7, some general aspects and terms of embodiments of the invention are described.

Domain: A particular topic, in particular a field of technology or natural science. As an example, domains may include biology, chemistry, computer science, engineering, material science, physics, psychology etc.

Domain-specificity: A measure whether a term is used mainly, exclusively or predominantly in one or more domains or whether it is commonly used across a plurality of domains.

Text term: A text term may be in particular a word or a multi-word.

Surface form of text term: The surface form of a text term is the form of a respective text term as it appears in the text and corresponds to "what we see" in a text term.

Domain-specific text corpus: A corpus comprising a plurality of text documents, e.g. abstracts from patents or scientific articles, which are specific for a particular domain.

Tokenizer: A unit or entity that performs a tokenization of a text term, in particular of a word or multiword expression, into smaller units, denoted as tokens. Tokens can generally be either words, characters, or something in between characters and words, in particular subwords.

Subword or subword-unit: A subword or subword-unit shall generally denote a unit that comprises tokens and is smaller than a text term. A subword or subword-unit may be a single character or n-gram characters or even an entire word. Subword-units may encompass in particular morphemes, prefixes, affixes, suffixes, stems and endings.

Subword-unit tokenizer: A unit or entity that performs a tokenization of a text term, in particular of a word or multiword expression, into smaller units, denoted as subwords or subword-units. Subword-unit tokenization is a solution between word and character-based tokenization. It addresses issues faced by word-based tokenization such as very large vocabulary size and character-based tokenization such as very long sequences. The goal of a subword-unit tokenizer is to be able to represent a text term into a fixed (and limited) set of subword units. The subword-unit tokenizer uses a set of subword-units which is defined as part of a training process over a text corpora. Subword-unit tokenizers according to embodiments of the invention use word segmentation algorithms. According to embodiments, Byte-Pair Encoding. WordPiece and unigram language modeling may be used. Such word segmentation algorithms or in other words subword-unit tokenization algorithms perform tokenization at the subword level and have been introduced to represent with high fidelity common words, and to represent less frequent words with longer sequences of symbols. For example, a tokenizer trained on general-domain corpora would encode the word "paracetamol" into ["para", "ce". "tam", "ol" while a tokenizer trained on the chemistry domain would encode it as ["paracetamol"] (see Table I below for other examples).

Subword-unit tokenization algorithms solve the problem of out-of-vocabulary words, as every token can be expressed as a combination of tokens belonging to a vocabulary. While the word segmentation algorithms share the same objective to split tokens into subword units belonging to a relatively small vocabulary, the way tokens are split can capture morphological features with different degrees of accuracy.

Domain-specificity fingerprint of a text-term: Such a domain-specificity fingerprint establishes a domain distribution feature of the text term and may also be denoted as heatmap.

A domain-specificity fingerprint of a text term comprises for each domain a plurality of numbers or values, wherein each number or value corresponds to a number of subword-units required to represent the text-term by a corresponding subword unit tokenizer of a set of subword-unit tokenizers allocated to the corresponding domain. Each subword unit tokenizer of a corresponding set has been trained with a different vocabulary size of a corresponding domain-specific text corpus. Accordingly, a domain-specificity fingerprint of a text term for a plurality m of domains and for n subword unit tokenizers per set and domain comprises m×n numbers or values. These values or numbers may hence be represented by an m×n matrix.

Embodiments of the invention disclose an unsupervised method which can be used to predict whether a word or multiword expression is uniformly used across multiple domains or whether it is peculiar of a specific domain. i.e., domain specific. Ranking multiword expressions by domain specificity has many important applications ranging from search, summarization, and term extraction. Methods according to embodiments of the invention use domain-specific subword-unit tokenizers to create a domain-specificity fingerprint. The domain-specificity fingerprints may be computed fast and efficiently, e.g., in 0.2 ms for a single multiword expression. Furthermore, it is not required that the multiword expression is present in the corpus.

Embodiments of the invention make use of multiple domain-specific text corpora to determine to which corpora and hence domain new text terms belong. Embodiments of the invention may be used in search engines to understand the intent of a given query. Search query understanding allows to provide answers that are relevant for a given query. Embodiments of the invention allow to predict the domain of the query by classifying the text term, in particular the multiword expression, using solely the surface form of the text term. Embodiments of the invention may be used to classify the domain of the query term by computing the domain-specificity fingerprint of the term.

Embodiments of the invention may be used in applications where a text term such as a word or multiword expression is given and an output signal is desired that indicates whether the word or multiword expression is specific towards a given textual domain, or whether it is used across different domains. Embodiments of the invention may be used to predict the domain provenance of a word or multiword expression by just using its surface form. To achieve this goal, embodiments of the invention use subword-unit tokenizers and large domain-specific corpora for training the subword-unit tokenizers with different vocabulary sizes.

Embodiments of the invention are based on the intuition of the present inventors that subword-unit tokenizers trained on a specific domain can represent a text term belonging to that domain with a lower number of subword units than tokenizers trained on distinct domains.

FIG. 2A shows a high-level illustration of a cognitive model 200 which may be used in a computer-implemented method for determining domain-specificity of a text term according to an embodiment of the invention. The cognitive model 200 comprises a plurality of domains 210a-x which may correspond e.g. to a particular field of technology or natural science. As an example, domains may include biology, chemistry, computer science, engineering, material science, physics, psychology etc.

For each of the domains 210a-x there is provided a set of subword-unit tokenizers comprising n subword-unit tokenizers 220, wherein n is an integer. As an example, for the domain A there is provided a set of subword-unit tokenizers 220 comprising n subword-unit tokenizers 220TA.1, TA.2, TA.3, . . . , TA.n. As a further example, for the domain B there is provided a set of subword-unit tokenizers comprising n subword-unit tokenizers TB.1, TB.2, TB.3, . . . , TB.n.

In order to train the subword-unit tokenizers 220 of a respective domain, a corresponding domain-specific text corpus is provided. A domain-specific text corpus comprises a plurality of text documents of a respective domain. As an example, abstracts from exemplary domains such as biology, chemistry, computer science, engineering, material science, physics and psychology may be collected, e.g. from Semantic Scholar. The abstracts may then be grouped by domain to create the corresponding domain-specific corpora. Each corpus may consist of a plurality of abstracts, e.g. 100000 or 1 million or more abstracts. Each of the subword-unit tokenizers 220 of a given domain is trained with a different vocabulary size of the corresponding domain-specific text corpus.

As an example, the vocabulary size may be increased by a power of 2. Assuming that a domain-specific text corpus of the domain A has a vocabulary size of 1048576, starting from TA.1 the tokenizers will be trained with an increasing vocabulary size and only the tokenizer TA.n will be trained with the complete vocabulary size of 1048576. As an example, the tokenizer TA.1 may be trained with a vocabulary size of 1024, the tokenizer TA.2 with a vocabulary size of 2048 and so on. According to embodiments, the size may be increased at various scales.

Figure 2B:
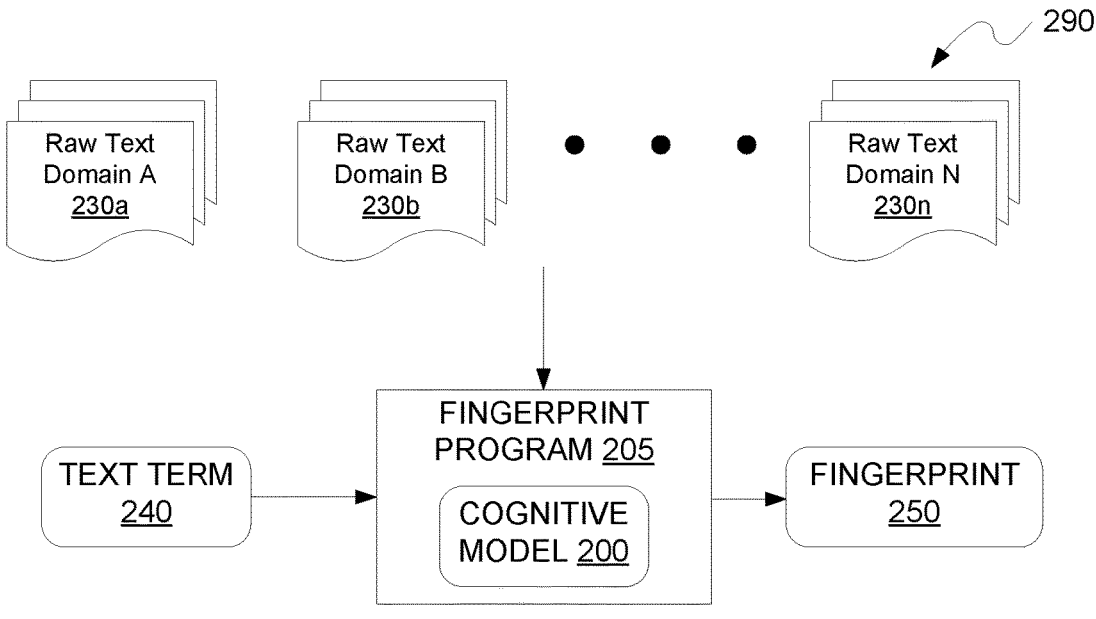
FIG. 2B depict a system for performing a computer-implemented method for determining domain-specificity of a text term.

Referring now to FIG. 2B, a system 290 for performing a computer-implemented method of fingerprint program 205 for determining domain-specificity of a text term 240 is illustrated. In computing system 290, the cognitive model 200 of FIG. 1 is executed or otherwise implemented via fingerprint program 205. The cognitive model 200 of fingerprint program 205 is trained with domain-specific text corpora 230a-n, i.e. the tokenizers of domain A with documents of a text corpus TCA, the tokenizers of domain B with documents of a text corpus TCB and the tokenizers of domain X with documents of a text corpus TCX. After training the cognitive model 200, the system 290 may perform an inference. During the inference, the computing system 290 receives one or more text terms and determines the domain-specificity of the received text term 240 by means of the computer-implemented method according to embodiments of the invention. More particularly, a domain-specificity fingerprint 250 of the text-term 240 is computed, which may also be denoted as heatmap. The domain-specificity fingerprint 250 comprises for each subword-unit tokenizer 220 a respective number of subword-units required to represent the received text-term. The fingerprint 250 of the text term may then be used for various application, e.g. for filtering, for classification or for other purposes.

Figures 3, 4:
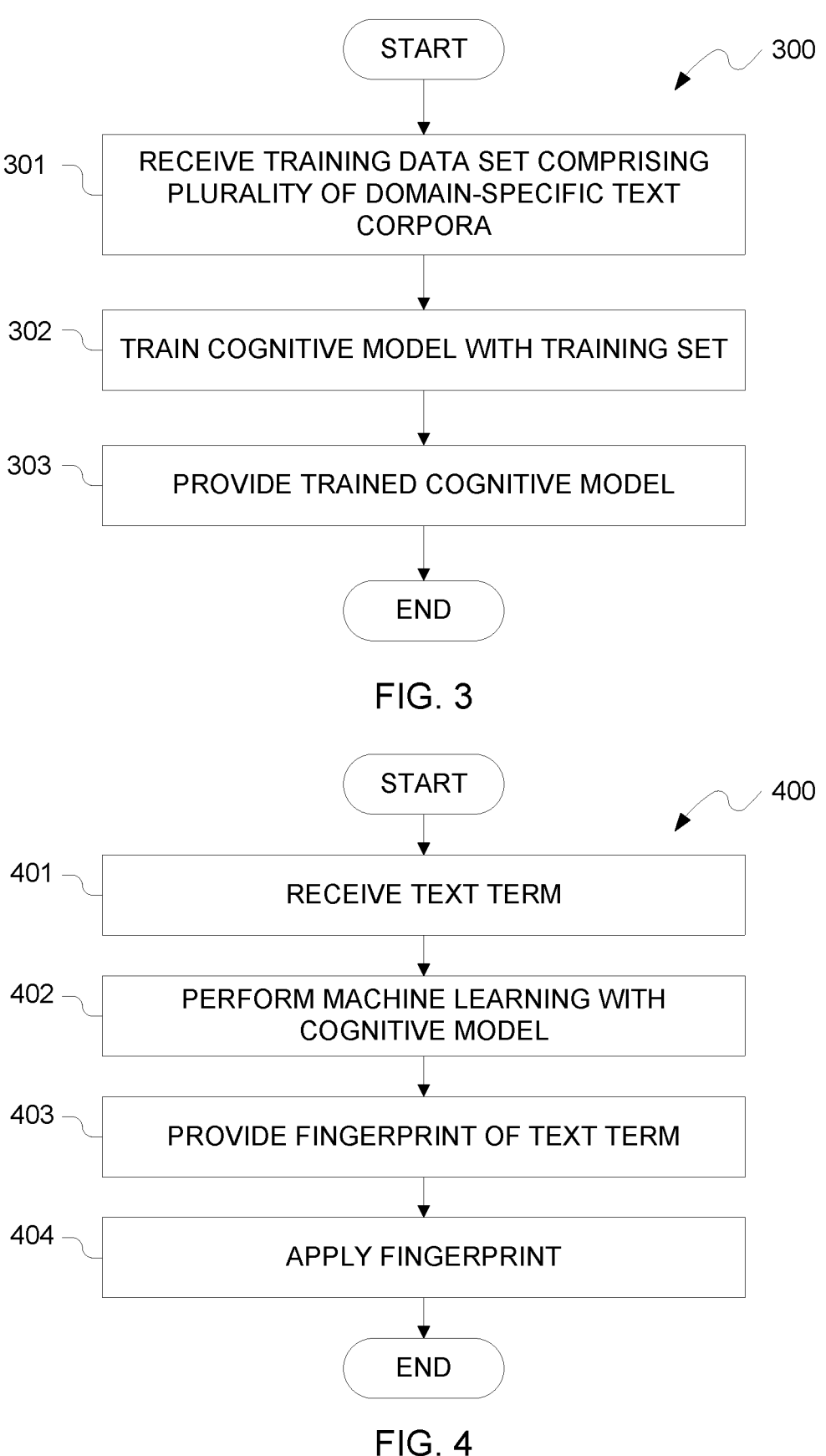
FIG. 3 depicts a flow chart of a computer-implemented method for training a machine learning application for determining domain-specificity of a text term.
FIG. 4 depicts a flow chart of a computer-implemented method for performing an inference of a machine learning program for determining domain-specificity of a text term.

FIG. 3 shows a flow chart 300 of a computer-implemented method for training a machine learning application for determining domain-specificity of a text term. At a step 301, a training data set is received which comprises a plurality of domain-specific text corpora. Each of the domain specific text corpora comprises a plurality of text documents, e.g. abstracts, of a respective domain. At a step 302, the cognitive model of the machine learning program is trained with the training data set. The cognitive model comprises for each of the respective domains a set of subword-unit tokenizers 220. The training comprises training each of the subword-unit tokenizers 220 of the respective set of subword-unit tokenizers 220 with a different vocabulary size of the corresponding domain-specific text corpus. At a step 303, the trained cognitive model is provided as output and can then be used for inference of the machine learning application.

FIG. 4 shows a flow chart 400 of a computer-implemented method for performing an inference of a machine learning program for determining domain-specificity of a text term. At a step 401, the machine learning program receives the text-term. At a step 402, the machine learning program is performed with the model provided at step 303. This includes computing a domain-specificity fingerprint of the text-term, wherein the domain-specificity fingerprint comprises for each subword-unit tokenizer a number of subword-units required to represent the text-term. At a step 403, the machine learning program provides the domain-specificity fingerprint as output. At a step 404, the machine learning program may apply the domain-specificity fingerprint for various applications such as classification and filtering.

In various embodiments, each of the plurality of domain-specific text corpora comprises a plurality of text documents of a corresponding domain. Assuming a similar structure of the underlying cognitive model as shown in FIG. 2A, training data sets of domain-specific text corpora for domains A, B, C, . . . , X can be achieved.

The machine learning application comprises a cognitive model which provides for each of the respective domains A, B, . . . , X a set of subword-unit tokenizers 220 TA1, TA,2, . . . , TA.n; . . . ; TX1, TX,2, . . . , TX.n. The sets of domain-specific text corpora are then used to train the subword-unit tokenizers 220 as follows: the tokenizer TA.1 is trained with a text corpus TCA.1 of a vocabulary size 1, e.g. a vocabulary size 1024. Then, the tokenizer TA.2 is trained with a text corpus TCA.2 of a vocabulary size 2, e.g. a vocabulary size 2048. These steps are then repeated with an increasing vocabulary size using e.g. powers of two.

This is reiterated until tokenizer TA.X is trained with the largest text corpus TCA.X of a vocabulary size X, e.g. a vocabulary size 1048576. Then the above mentioned steps are performed for the next domain B, with increasing vocabulary sizes. The above described procedure is then repeated for all the domains a-x of the respective application in a corresponding manner.

Figure 5:
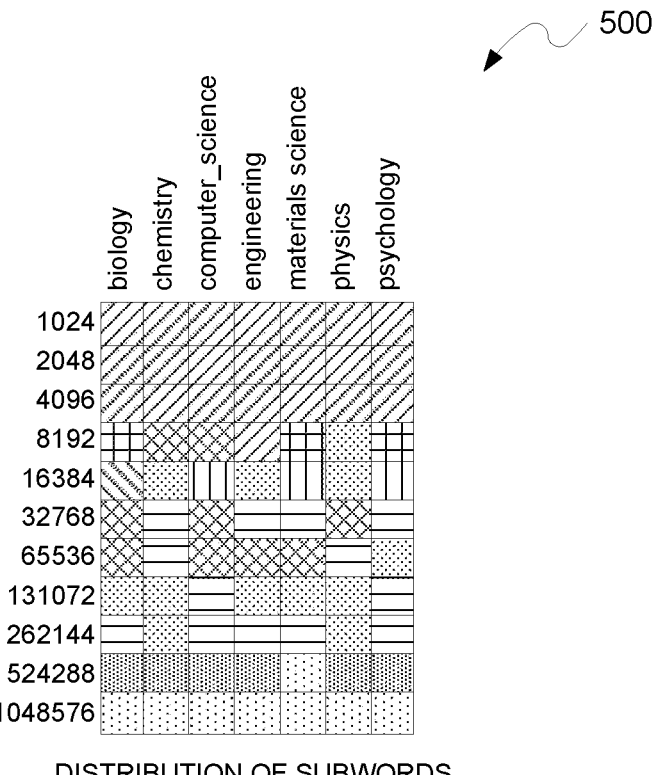
FIG. 5 depicts a domain-specificity fingerprint of exemplary text terms of embodiments of the invention.

FIG. 5 show domain-specificity fingerprint 500 of text terms, wherein the text terms are not contained in the plurality of domain-specific corpora which have been used for training. The x-axis corresponds to the different domains and the y-axis represents different vocabulary sizes of the domain-specific corpora. For each combination, the required minimum number of subword units of the given term is shown which has been computed by the corresponding subword-unit tokenizer. From FIG. 5 it can be observed that the domain of each term can be identified by finding the subword-unit tokenizer that produces the minimum number of subword-units with the smallest vocabulary.

In various embodiments, an approach which is used according to embodiments of the invention is to determine the domain specificity of the text term by analyzing a contour of the domain-specificity fingerprint. The contour may comprise for each domain a value corresponding to a respective subword-unit tokenizer of the domain at which a minimum number of subword units required to encode the text term across all domains and vocabulary sizes is reached. According to embodiments, the contour may be computed by determining at first a minimum number of subword units required to encode the text term across all domains and vocabulary sizes. Furthermore, the subword-unit tokenizers 220 of the highest vocabulary size may be defined as reference or height level or bottom. Then, for each domain a value or height may be computed corresponding to a distance to the reference level at which the minimum number is achieved. If the minimum number is not achieved within the domain, a value or height 0 may be assigned.

According to embodiments, the domain specificity of the fingerprint may be determined by computing the maximum delta between consecutive values in the contour and using the maximum delta as a score for the domain-specificity of the text term. According to embodiments a threshold value for the maximum delta may be assigned. If the maximum of the deltas is above a threshold, then the word is domain specific. According to embodiments, a value of 3 has been proven to work well. On the other hand, if the maximum threshold value is 0 or 1, then the contour is basically a flat line corresponding to terms which do not have a high-domain specificity. According to embodiments, the deltas may be sorted and only the difference between the two largest deltas may be verified. According to further embodiments, more complex schemes may be used to identify peaks on the histogram made of the deltas. According to embodiments, the "peakiness"/skewness of the contour may be used as well as the area under the curve (AUC).

According to further embodiments, the method of for determining domain-specificity of text terms may be used to determine the domain provenance of terms and for topic classification. According to embodiments, a system may be provided which can load the domain-specificity fingerprint for a large set of multiword expressions. Given a specific multiword expression as input, methods according to embodiments of the invention may find all the multiword expressions which are close to the input expression according to the cosine similarity of the corresponding domain-specificity fingerprints.

To extract a feature vector from a domain-specificity fingerprint, the fingerprint may be represented in column-wise order and the values may be normalized using the L2 norm. According to embodiments a k-nearest neighbors classifier may be used to discriminate multiword expressions according to the domain they belong to.

According to embodiments, a large dataset of domain-specificity fingerprints may be computed and then a set of k centroids may be computed, where k is the number of the domains for which the subword-unit tokenizers 220 have been trained. To classify a given text term, methods according to embodiments of the invention may compute the corresponding domain-specificity fingerprint and then compute the distance between the respective domain-specificity fingerprint and the centroids. In practice, such operations may be executed in less than one millisecond.

Methods according to embodiments of the invention may be used to improve the precision of term extractor annotators. Such term extractors are pre-trained language models that are fine-tuned for the term extraction task. The training data used for fine-tuning may be generated with a fully unsupervised approach and may be embodied as a dataset for sequence tagging expressed e.g., in IOB format (inside, outside, beginning).

When building the training dataset for such a term extraction task, embodiments of the invention may be used to filter out noisy annotations from the IOB training set, e.g. unspecific terms. As explained above, methods according to embodiments of the invention may be used to detect configurations corresponding to configurations as shown in FIG. 9*a* which are most probably not domain-specific.

Furthermore, embodiments of the invention may be used to provide a training dataset that covers multiple domains without having some domains overrepresented than the others. Embodiments of the invention may be used to prioritize highly domain-specific terms while eliminating non-domain specific terms.

Figure 6:
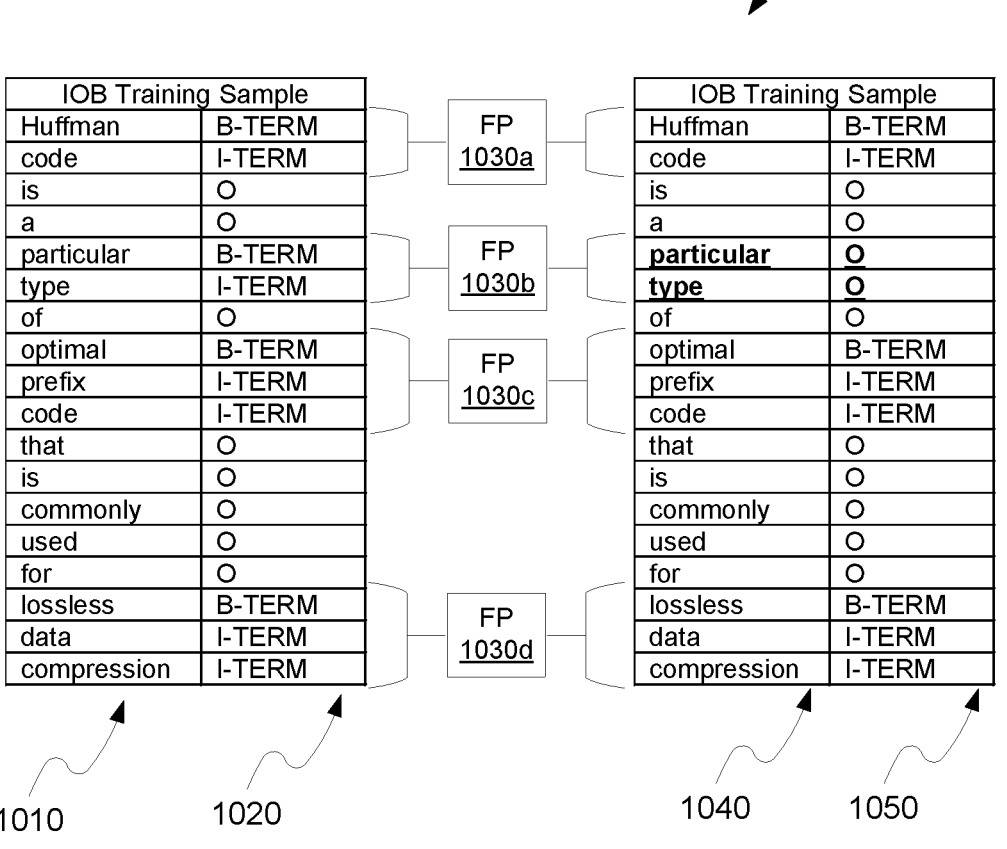
FIG. 6 illustrates a corresponding example of a method according to embodiments of the invention to filter out non-domain specific terms while prioritizing domain specific terms.

FIG. 6 illustrates a corresponding example process, designated 1000, according to embodiments of the invention to filter out non-domain specific terms while prioritizing domain specific terms. More particularly, FIG. 6 shows an JOB training sample text "Huffman code is a particular type of optimal prefix code that is commonly used for lossless data compression". The left column 1010 shows the input training sample and the column 1020 the corresponding IOB tagging. For the multi-word expressions comprising the respective B-terms and I-terms a domain-specificity fingerprints are computed and shown as fingerprints (FPs) 1030*a*-*d*. The IOB filtered training sample is then shown in columns 1040 and 1050.

The domain-specificity fingerprint of the multi-word expression "particular type" reflects an unspecific multiword expression similar to the domain-specificity fingerprint. Hence it can be removed according to embodiments to prioritize highly-specific terms such as "optimal prefix code" or "lossless data compression" as shown in the columns 1040 and 1050.

According to embodiments, datasets may be balanced according to domains. Given the domain-specificity fingerprints of all the text terms of a given set, a domain-specificity fingerprint matrix may be built and clustered in k clusters, where k is the number of domains. Then, k centroids may be computed/determined. Then, for each term in the dataset, the distance to the k centroids may be computed. By repeating the process for each text term, a histogram may be computed which stores the number of samples per domain and, eventually, may discard some samples to balance the number of (training) instances by domain.

Figure 7:
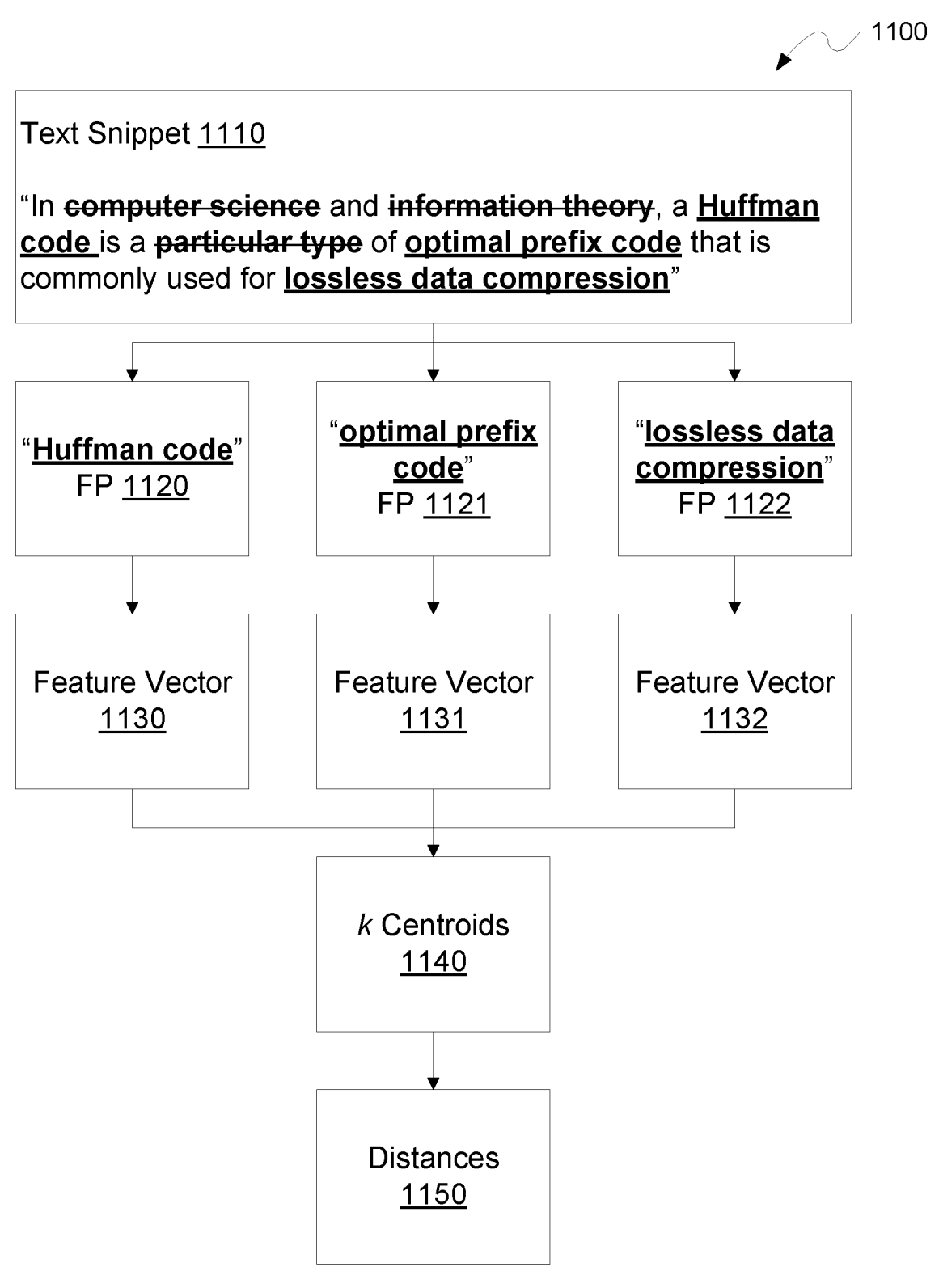
FIG. 7 illustrates steps of a method for topic modelling according to an embodiment of the invention.

FIG. 7 illustrates steps of a method, generally designated as 1100, for topic modelling according to an embodiment of the invention. It starts with a text snippet 1110 from which multiword expressions which are not domain specific are filtered out, in this example the multiword expressions "computer science", "information theory" and "particular type". Furthermore, domain-specific multi-words are extracted such as "Huffman code", "optimal prefix code" and lossless data compression".

For these domain-specific multi-words the domain-specificity fingerprints 1120, 1121 and 1122 are computed. From the domain-specificity fingerprints 1120, 1121 and 1122 feature vectors 1130, 1131 and 1132 are computed respectively. The feature vectors 1130, 1131 and 1132 represent the domain-specificity fingerprint in column-wise order and the values are normalized using the L2 norm, i.e. they are calculated as the square root of the sum of the squared vector values. Furthermore, a large matrix of heatmap features may be built corresponding to a large vocabulary of terms using the tokenizers corresponding to the k domains. Then k centroids 1140 can be identified with a clustering algorithm such as k-means. The classification of a given term may then be performed by computing the minimum distances 1150 between a given term and each of the k centroids.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method for determining domain-specificity of a text term to improve precision of pre-trained language models in the computerized field of natural language processing, the method comprising:

receiving a plurality of domain-specific text corpora, wherein each of the plurality of domain-specific text corpora comprises a plurality of text documents associated with a respective domain;

training a set of subword-unit tokenizers with at least two different vocabulary sizes of the respective domain-specific text corpus;

receiving the text-term;

determining a domain-specificity fingerprint of the text-term, wherein the domain-specificity fingerprint comprises for each subword-unit tokenizer a number of subword-units required to represent the text-term; and providing the domain-specificity fingerprint for determining the domain-specificity of the text term, wherein the domain-specificity of the text term is a measure of whether a term is used predominantly in one or more specific domains or whether it is used in a plurality of domains, wherein the domain-specificity of the text term is determined at least in part by analyzing a contour of the domain-specificity fingerprint and the contour comprises a variable corresponding to a respective subword-unit tokenizer of the domain at which a minimum number of subword units required to encode the text term across all domains is reached.

2. The computer-implemented method of claim 1, wherein the text term comprises words or multi-words.

3. The computer-implemented method of claim 1, wherein determining the domain-specificity fingerprint further comprises:

assigning the text term to one or more domains of the respective set of subword-unit tokenizers that compute a minimum number of subword-units required to represent the text-term with the smallest vocabulary size.

4. The computer-implemented method of claim 1, wherein determining the domain specificity by analyzing the contour further comprises:

computing the maximum delta between any pair of values in the contour; and assigning the maximum delta as a score for the domain-specificity of the text term.

5. The computer-implemented method of claim 2, wherein the domain-specificity fingerprint of the multi-words are based on a domain provenance of the text-term using a k-nearest neighbor algorithm (k-NN) classifier.

6. A computer program product for determining domain-specificity of a text term to improve precision of pre-trained language models in the computerized field of natural language processing, the computer program product comprising:

one or more non-transitory computer-readable storage media; and program instructions stored on the one or more non-transitory computer-readable storage media, the program instructions to perform-operations comprising:

receiving a plurality of domain-specific text corpora, wherein each of the plurality of domain-specific text corpora comprises a plurality of text documents associated with a respective domain;

training a set of subword-unit tokenizers with at least two different vocabulary sizes of the respective domain-specific text corpus;

receiving the text-term;

determining a domain-specificity fingerprint of the text-term, wherein the domain-specificity fingerprint comprises for each subword-unit tokenizer a number of subword-units required to represent the text-term; and providing the domain-specificity fingerprint for determining the domain-specificity of the text term, wherein the domain-specificity of the text term is a measure of whether a term is used predominantly in one or more specific domains or whether it is used in a plurality of domains and the domain specificity is determined by analyzing a contour of the domain-specificity fingerprint by computing a maximum delta between any pair of values in the contour and assigning the maximum delta as a score for the domain-specificity of the text term.

7. The computer program product of claim 6, wherein the text term comprises words or multi-words.

8. The computer program product of claim 6, wherein determining the domain-specificity fingerprint further comprises:

assigning the text term to one or more domains of the respective set of subword-unit tokenizers that compute a minimum number of subword-units required to represent the text-term with the smallest vocabulary size.

9. The computer program product of claim 6, wherein the contour comprises a value corresponding to a respective subword-unit tokenizer of the domain at which a minimum number of subword units required to encode the text term across all domains and vocabulary sizes is reached.

10. The computer program product of claim 7, wherein the domain-specificity fingerprint of the multi-words are based on a domain provenance of the text-term using a k-nearest neighbor algorithm (k-NN) classifier.

11. A computer system for determining domain-specificity of a text term to improve precision of pre-trained language models in the computerized field of natural language processing, the computer system comprising:

one or more computer processors;

one or more computer readable storage media; and program instructions stored on the computer readable storage media for execution by at least one of the one or more processors, the program instructions comprising:

program instructions to receive a plurality of domain-specific text corpora, wherein each of the plurality of domain-specific text corpora comprises a plurality of text documents associated with a respective domain;

program instructions to train a set of subword-unit tokenizers with at least two different vocabulary sizes of the respective domain-specific text corpus;

program instructions to receive the text-term;

program instructions to determine a domain-specificity fingerprint of the text-term, wherein the domain-specificity fingerprint comprises for each subword-unit tokenizer a number of subword-units required to represent the text-term; and program instructions to provide the domain-specificity fingerprint for determining the domain-specificity of the text term, wherein the domain-specificity of the text term is a measure of whether a term is used predominantly in one or more specific domains or whether it is used in a plurality of domains, wherein the domain-specificity of the text term is determined at least in part by analyzing a contour of the domain-specificity fingerprint and the contour comprises a variable corresponding to a respective subword-unit tokenizer of the domain.

12. The computer system of claim 11, wherein the text term comprises words or multi-words.

13. The computer system of claim 11, wherein determining the domain-specificity fingerprint further comprises:

program instructions to assign the text term to one or more domains of the respective set of subword-unit tokenizers that compute a minimum number of subword-units required to represent the text-term with the smallest vocabulary size.

14. The computer system of claim 11, wherein determining the domain specificity by analyzing the contour further comprises:

program instructions to compute the maximum delta between any pair of values in the contour; and program instructions to assign the maximum delta as a score for the domain-specificity of the text term.

* * * * *